United States Patent
Henty

(10) Patent No.: US 9,625,992 B2
(45) Date of Patent: *Apr. 18, 2017

(54) REMOTE CONTROL WITH DUAL ACTIVATED TOUCH SENSOR INPUT

(71) Applicant: I-INTERACTIVE LLC, Irvine, CA (US)

(72) Inventor: David L. Henty, Newport Beach, CA (US)

(73) Assignee: I-INTERACTIVE LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,374

(22) Filed: Oct. 20, 2016

(65) Prior Publication Data

US 2017/0038844 A1 Feb. 9, 2017

Related U.S. Application Data

(63) Continuation-in-part of application No. 14/518,969, filed on Oct. 20, 2014, now Pat. No. 9,478,124.

(60) Provisional application No. 61/893,797, filed on Oct. 21, 2013, provisional application No. 61/916,718, filed on Dec. 16, 2013, provisional application No. 61/988,805, filed on May 5, 2014.

(51) Int. Cl.
*G06F 3/01* (2006.01)
*G08C 17/02* (2006.01)

(52) U.S. Cl.
CPC ............. *G06F 3/016* (2013.01); *G08C 17/02* (2013.01)

(58) Field of Classification Search
CPC .... G08C 17/02; G08C 23/04; G08C 2201/20; G08C 19/00; G08C 2201/30; G08C 2201/92; G08C 17/00
USPC ....................................... 340/12.54
See application file for complete search history.

(56) References Cited

U.S. PATENT DOCUMENTS

| | | | |
|---|---|---|---|
| 5,436,625 A | 7/1995 | Kubo | |
| 5,675,390 A | 10/1997 | Schindler et al. | |
| 5,831,555 A | 11/1998 | Yu et al. | |
| 6,094,156 A | 7/2000 | Henty | |
| 6,292,172 B1 | 9/2001 | Makhlouf | |
| 7,119,795 B2 | 10/2006 | Rekimoto | |
| 7,123,242 B1 | 10/2006 | Henty | |
| 7,433,179 B2 | 10/2008 | Hisano et al. | |
| 7,692,625 B2 | 4/2010 | Morrison et al. | |
| 7,916,460 B2 * | 3/2011 | Henty | G08C 17/02 341/22 |
| 8,130,210 B2 | 3/2012 | Saxena et al. | |
| 8,646,000 B2 * | 2/2014 | Kang | G06F 3/0482 345/633 |
| 8,902,173 B2 * | 12/2014 | Seguine | G06F 3/03548 345/156 |
| 9,277,156 B2 * | 3/2016 | Bennett | G11B 19/027 |

(Continued)

OTHER PUBLICATIONS

Office Action dated Mar. 5, 2014 from U.S. Appl. No. 13/544,398, 10 pages.

*Primary Examiner* — Mark Blouin

(57) ABSTRACT

A remote control with a shared touch sensor such as a touch pad is disclosed. The touch sensor is responsive to input from two different surfaces of the remote control providing attendant space and cost advantages. The touch sensor may be responsive to continuous touch input or to tactile input buttons adapted to activate the touch sensor when depressed.

20 Claims, 12 Drawing Sheets

(56) References Cited

U.S. PATENT DOCUMENTS

| | | |
|---|---|---|
| 2003/0092470 A1 | 5/2003 | Kurakane |
| 2006/0183994 A1 | 8/2006 | Murayama et al. |
| 2007/0216662 A1 | 9/2007 | Tanaka et al. |
| 2009/0079699 A1 | 3/2009 | Sun |
| 2009/0244832 A1 | 10/2009 | Behar et al. |
| 2010/0259482 A1 | 10/2010 | Ball |
| 2011/0279223 A1 | 11/2011 | Hatambeiki et al. |
| 2011/0291988 A1 | 12/2011 | Bamji et al. |
| 2013/0077228 A1* | 3/2013 | Batio .................. G06F 1/1641 361/679.29 |

* cited by examiner

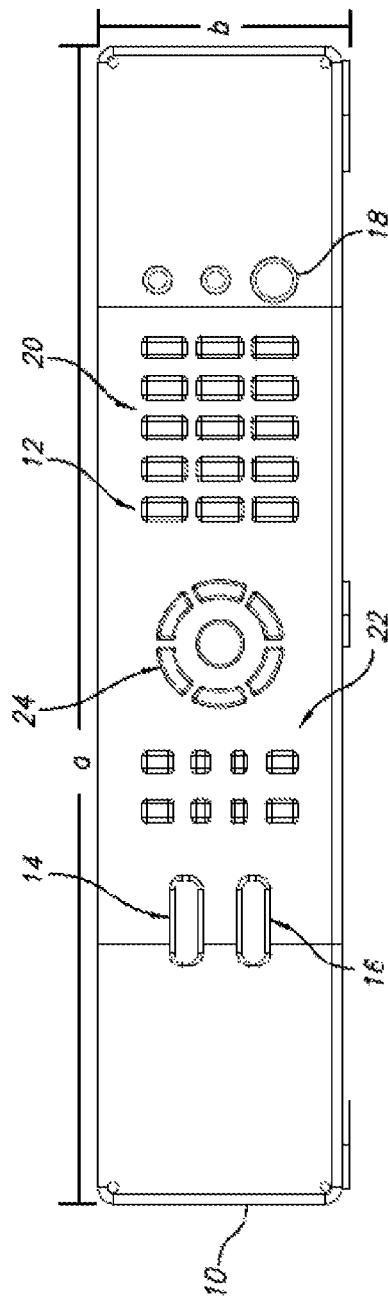
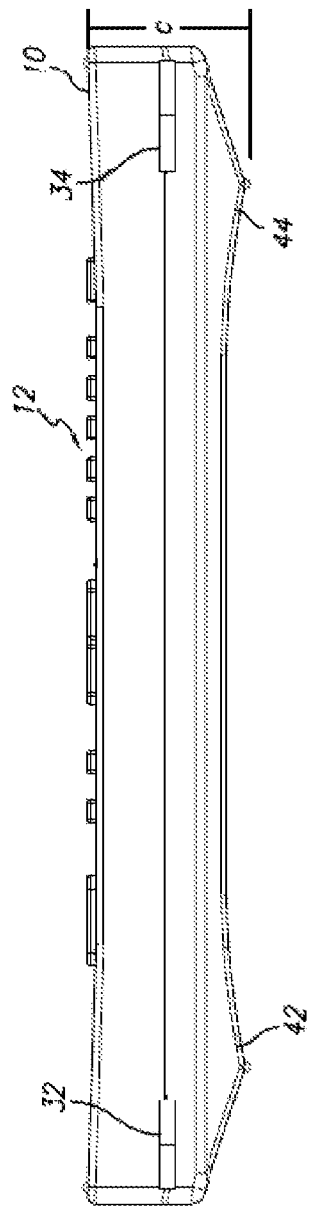
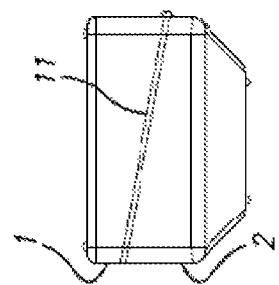
FIG. 1A
FIG. 1B
FIG. 1C

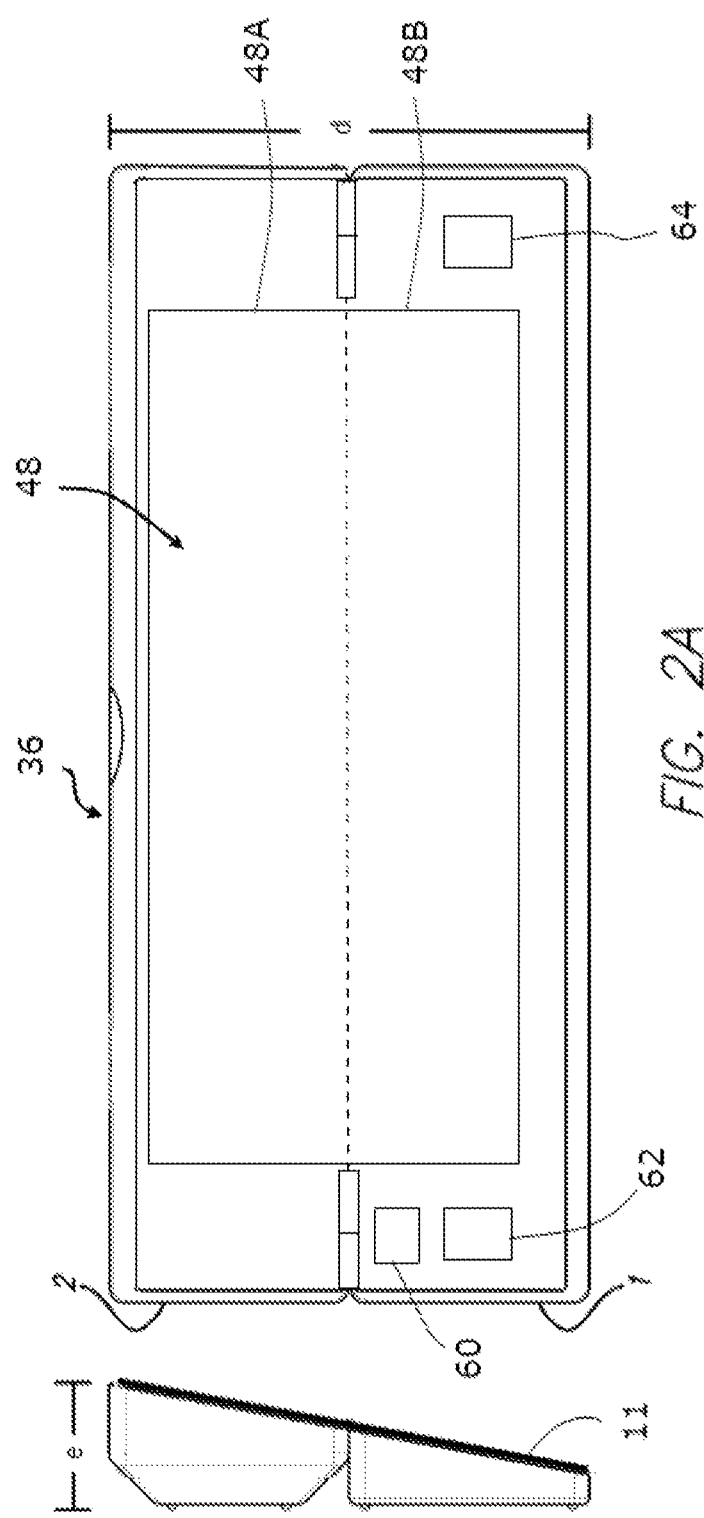

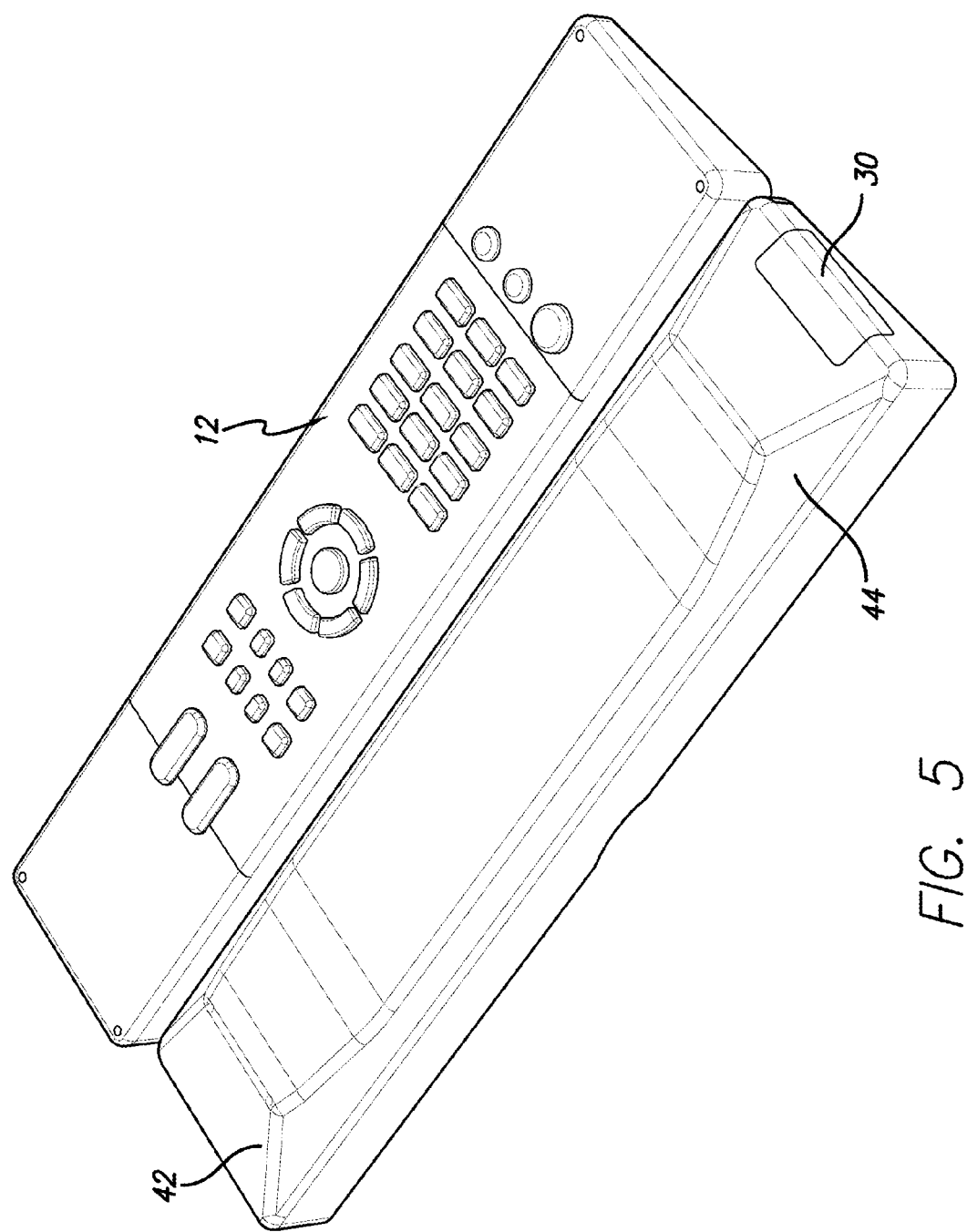

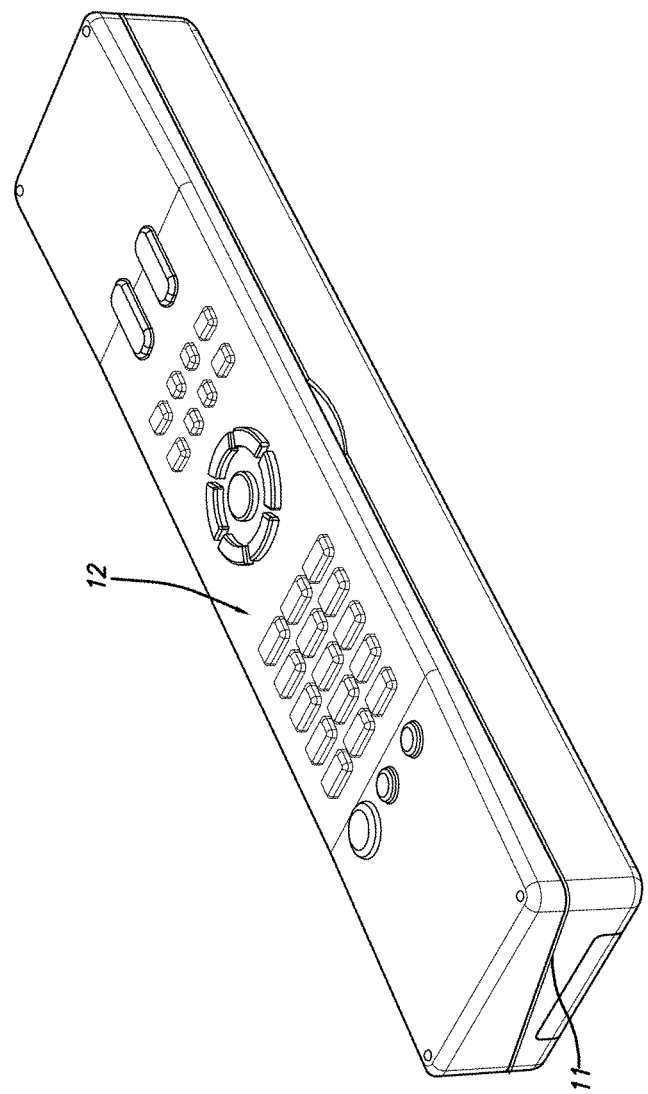

REMOTE CONTROL WITH DUAL ACTIVATED TOUCH SENSOR INPUT

RELATED APPLICATION INFORMATION

The present application is a continuation in part of application Ser. No. 14/518,969 filed Oct. 20, 2014, U.S. Pat. No. 9,478,124, which claims priority under 35 U.S.C. Section 119(e) to U.S. Provisional Patent Application Ser. No. 61/893,797 filed Oct. 21, 2013; U.S. Provisional Patent Application Ser. No. 61/916,718 filed Dec. 16, 2013, and U.S. Provisional Patent Application Ser. No. 61/988,805 filed May 5, 2014, the disclosures of which are incorporated herein by reference in their entirety.

BACKGROUND OF THE INVENTION

1. Field of the Invention

The present invention relates to remote control systems for controlling entertainment systems, such as multimedia systems, Internet access systems and browsers, and related methods.

2. Description of the Prior Art and Related Information

Remote control systems are ubiquitous in entertainment systems and multimedia systems of a wide variety, including TVs, game systems, VCRs and many other well-known entertainment devices. At the same time, the need has arisen for providing computer related control capabilities in the living room along with the control of the more conventional entertainment devices typically present in the living room. For example, combined PC and TV systems have been introduced which integrate the capabilities of the personal computer with the television. Also, set top Internet access devices have been introduced which integrate Internet access capabilities with conventional televisions. The ability to provide full control of a PC or an Internet browser typically requires the use of a keyboard as well as a mouse. A conventional remote control is therefore inadequate for control of such combined entertainment systems.

SUMMARY OF THE INVENTION

In one aspect the present invention provides a remote control comprising upper and lower surfaces and a shared touch sensor, responsive to touch input including substantially continuous motion, configured on or adjacent the upper or lower surface and responsive to touch input on both the lower surface and the upper surface. The remote control further comprises at least one controller coupled to the touch sensor and providing touch control information separately responsive to touch input on the upper and lower surfaces.

Further features and aspects of the invention are set out in the following detailed description.

BRIEF DESCRIPTION OF THE DRAWINGS

FIGS. 1A, 1B, and 1C are top, side and end views of a preferred embodiment of the remote controller of the present invention with the housing in a folded or closed position.

FIGS. 2A and 2B are top and end views respectively of the remote controller of the present invention with the housing in an open configuration.

FIG. 5 is a bottom perspective view of the remote controller of the present invention with the housing in an open configuration.

FIGS. 6A and 6B are top perspective views of the remote controller in a closed position, viewed from the front and back respectively.

DETAILED DESCRIPTION OF THE INVENTION

Figure 3:
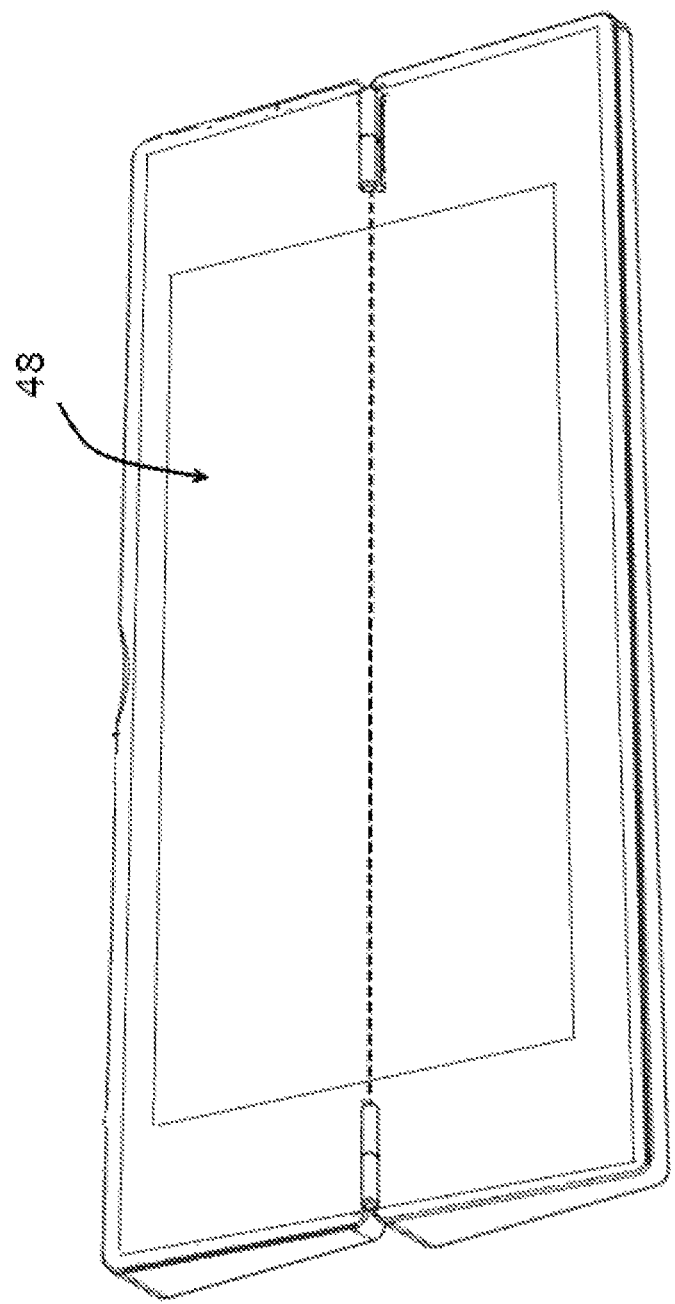
FIG. 3 is a top perspective view of the remote controller of the present invention with the housing in an open configuration.

The present invention provides a remote control having enhanced touch input control. In one aspect the present invention comprises a folding remote control with an inner touch surface such as a touch pad. This touch surface spans both inner surfaces of the two sections of the folding remote providing a large touch surface. This allows ease of use and also can provide features such as multi-touch control. Back lighting may provide a relatively large keyboard input spanning both sections which can be selected for display at the push of a button.

In FIGS. 1-7 the present invention is illustrated in various perspective, top, end and side views in a presently preferred embodiment. The remote 10 is adapted for use with an entertainment system including a TV and internet connection, either in the TV or in a separate device. The remote includes RF and/or IR transmitters for control of the TV and other devices. Details of such an entertainment system, and IR and RF control operation of such a system, as well as additional details on a suitable housing construction for the remote are set out in U.S. Pat. Nos. 5,675,390, 6,094,156, 7,123,242, and 7,916,460, the disclosures of which are incorporated herein by reference in their entirety.

The remote control system of the present invention is configured in a housing 10 which is adapted to be opened and closed in a folding manner, preferably along one edge of the housing. FIGS. 1A, 1B, and 1C show the housing in a closed configuration whereas FIGS. 2A and 2B show the housing in an open configuration. FIGS. 3-6 in turn show perspective and top views of open and closed configurations. The housing has a generally rectangular configuration viewed from above with a length "a", a width "b" when closed and a double width "d" when open. The housing further has a depth "c" when closed. The length, depth "c" and width "b" are preferably selected so as to allow the remote control to be held comfortably in one hand when the housing is closed. Also, the dimensions are preferably selected to allow the provision of a large touch pad when the housing is in the open configuration. Therefore, to provide a convenient size to be hand-held while closed and provide a keyboard when opened, the dimensions of the housing are preferably in the range indicted in Table 1 below. This provides a width approximately that commonly found in conventional remote controls and provides a comfortable width to hold in one hand while providing an open configuration. The section through the remote housing (which may include a layer 11 as described below) is preferably angled as shown and the remote when opened has an ergonomic angle with an upward angle toward the TV and also a lay flat bottom surface for a more stable feel. Details of embodiments are described in the '460 patent. Specifically, the angled surface when open provides a maximum height "e" and as shown the section thus extends from a midpoint at height 0.5 c to "e". The angle of the section is chosen to provide a desired surface angle and also sufficient room in the top section for dual circuit boards and associated keys and buttons, for example, 8-13 degrees, as shown schematically in FIG. 7.

TABLE 1 a = 15-25.5 cm
b = 5.0-6.5 cm
c = 2.5-3.75 cm
d = 10-13 cm
e = 1.9-2.9 cm

Referring to FIG. 1A, the top surface of the housing 10 includes a number of remote control inputs indicated generally at 12. This first set of control inputs 12 may correspond to conventional remote control functions typically found in hand-held TV remote controls or universal remote controls adapted to control multiple entertainment devices such as TVs, cable or satellite set top boxes, DVRs, VCRs, CD players, DVD players, etc. Therefore the first set of remote control inputs include the volume up and down set of controls 14, a channel up and down set of controls 16, a power button 18 and a set of numeric inputs 20. Also, a number of programmable or special purpose control buttons may be provided these are indicated generally as buttons 22. Also inputs adapted for game control may be provided as part of the first set of inputs 12, examples of which are disclosed in the above noted '390 patent incorporated by reference. Optionally, a microphone may be provided (as described in the above noted patents and incorporated herein by reference) which may provide a telephone or videophone functionality or which may be used for voice recognition control of the system. Also, a multi-directional controller 24 is preferably provided. The multi-directional controller 24 is illustrated as a up, down, left, right type controller typically found controlling menu type functions, for example, in cable or satellite broadcast television systems. The multi-directional controller 24 may also be a trackball which may provide mouse type control. As will be discussed below, such mouse type controllers may require careful consideration in for depth requirements to not impact on the space available on the inside portion of the controller for the keyboard controls. Alternatively, multi-directional controller 24 may be any of variety of other well-known controller types such as a force sensitive controller or a touch pad controller of the type commonly employed in notebook computers. The first set of controls 12 activate a first wireless transmitter 30 which may preferably be an LED or RF transmitter configured at one end of the housing 10.

Referring to FIGS. 1B and 1C, side and end views of the remote control are illustrated. In these respective views the division of the housing into two sections 1 and 2 which may be opened and closed in a folding manner about hinges 32 and 34 is clearly shown. In one embodiment a first side of the bottom section 2, corresponding to the front of the keyboard when the housing is an opened configuration, includes a second wireless transmitter 36 which also is preferably a wireless RF or LED transmitter (FIG. 2A). If a single RF transmitter is employed this second wireless transmitter 36 may be dispensed with. Various latching approaches may be employed including mechanical or magnetic latches. If a mechanical latch is employed bottom section 2 may also include a catch release which releases the top section 1 to be opened. A sensor in the latch or hinge also deactivates the first inputs 12 and activates the touch pad 48. The bottom section 2 also accommodates batteries indicated by dashed lines 40 (shown in FIG. 7) which may, for example, be two or more AAA type batteries. The shape of the bottom section 2 is illustrated having a varying thickness for a more ergonomic feel with thickened end portions 42, 44 and a thinner tapered middle portion 46 having a length sufficient to accommodate the width of a user's hand. For example, the length of the thinner portion may be about four inches with the overall thickness of the housing 10 in this region being about 1.5 inches or less to allow the comfortable holding of the housing in the closed position in one hand of the user in this region. Alternatively, as in the views of FIGS. 6A and 6B, a more even bottom section may also be employed. The tapered bottom section 2 not only provides additional space in the end portions 42, 44 for the batteries, but also provides a curved lower surface which may comfortably sit on one leg of a user or on one arm of a sofa or chair of a type typically found in a living room. Also, to avoid the remote keys 12 rubbing against the support surface when the remote is open, the top surface may curve slightly upward adjacent the ends as best shown in FIG. 1B to allow the keys 12 to be below the plane of the contact points. As best shown in FIG. 1C the sides of the top and bottom sections may preferably have a matching flat surface on either side of the hinge which causes a stop to pivoting of the top section at 180 degrees and preserves the angle of the inner surface as shown in FIG. 2B. This flat portion is shown as vertical in FIG. 1C but need not be and the angled portion for an ergonomic grip may extend up past the hinge. Also the lower grip portion may be curved with a flat angled portion provided on either side of the hinge to enforce the 180 degree pivot. Other means for enforcing the 180 degree motion may also be provided, however, such as a stop in the hinge mechanism.

Figure 4:
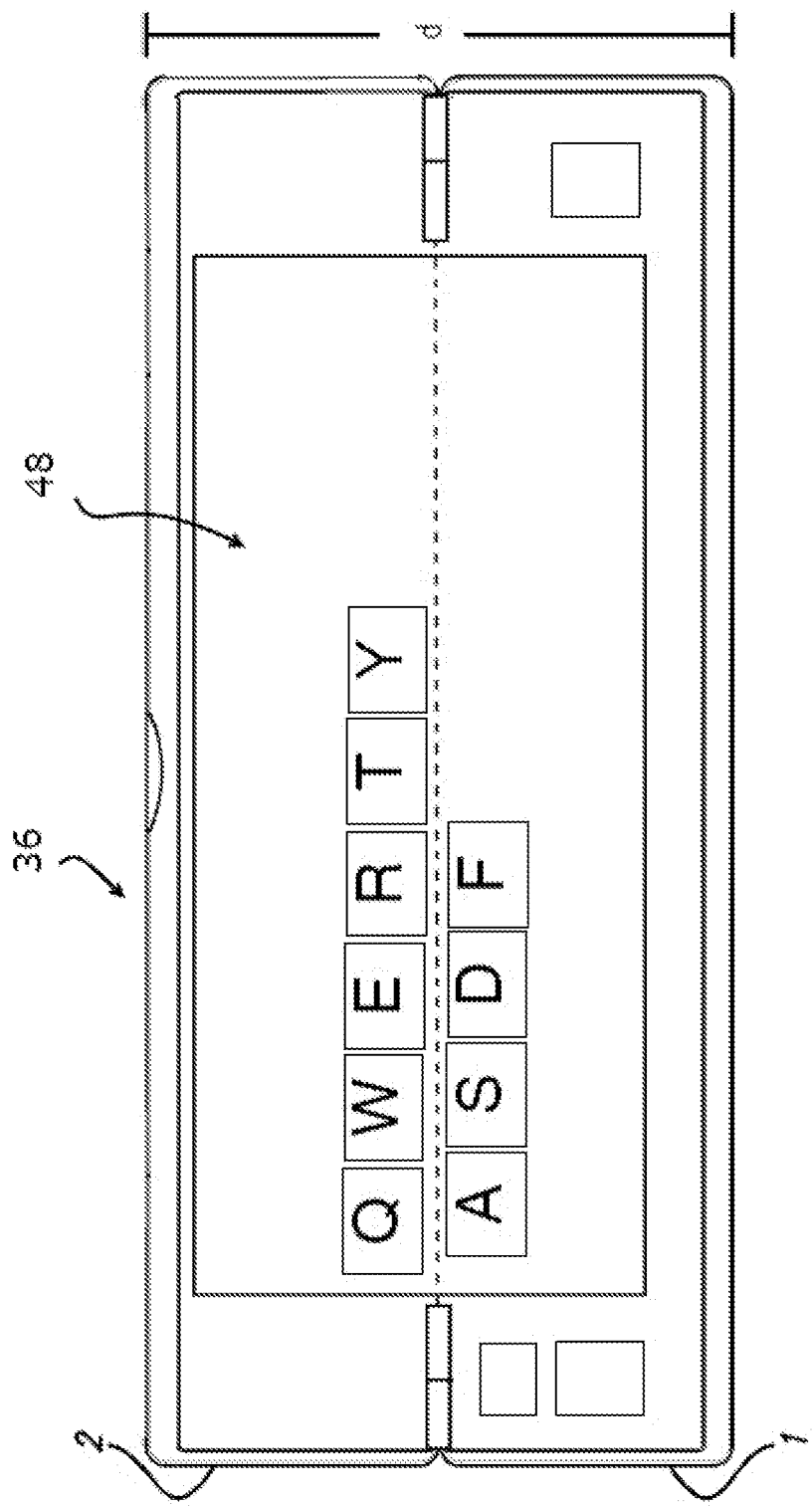
FIG. 4 is a top view of the remote controller of the present invention with the housing in an open configuration showing a keyboard displayed on the touch surface of the controller.
Figure 6B:
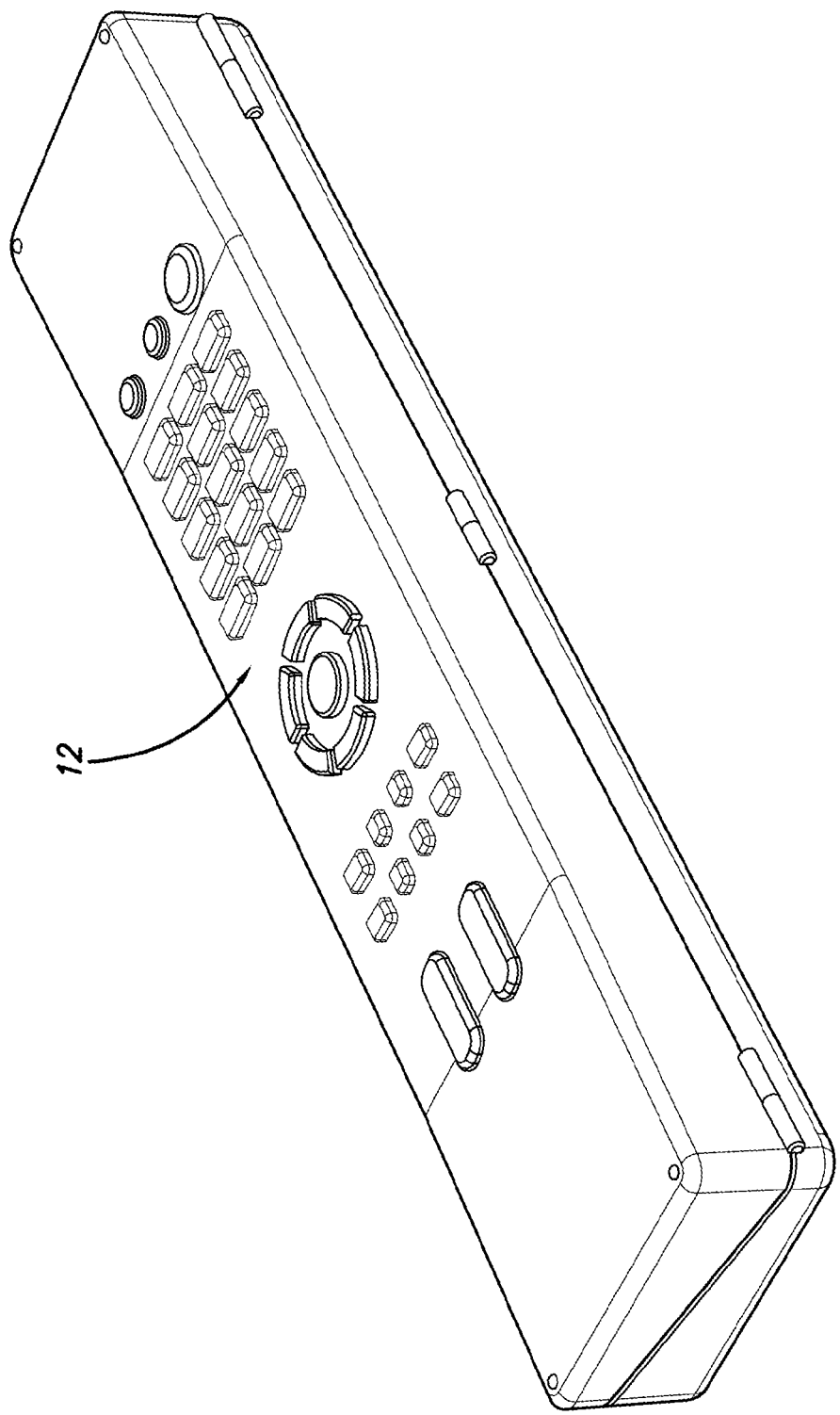

Referring to FIGS. 2A, 3, and 4 the layout of the remote controller on the inside surfaces of the first section 1 and second section 2 is shown with the housing in an opened configuration exposing a large touch pad, or touch screen display, 48 having separate sections 48A, 48B. Various types of touch pads or touch screens are well known and as one example may employ capacitive touch position sensing. Generally, such touch sensors provide substantially continuous touch position sensing which may be employed in different approaches as discussed in more detail below. As shown, the housing in an opened configuration provides a width "d"=2 "b" which can accommodate a large touch surface 48. Touch pad or screen 48 may be covered with a layer 11 continuously extending across both sections 48A, 48B to provide a smooth feel for finger motion across the gap between the sections. Although the gap will preferably as small as possible, practically a gap of less than 1 mm is difficult to achieve and depending on hinge design and manufacturing issues the gap may be between about 1 mm and 5 mm. Layer 11 should be of a suitable material which is smooth, bendable but not subject to creasing, and durable. Examples of materials include polyester (e.g., PET or PEN)

and related materials, polymides, various crease resistant polymers, such as thin polyurethane or polycarbonate layers, Mylar and like materials, etc. Also, multi-layer films may be employed. As one specific example the teachings of U.S. Pat. No. 6,841,190 may be employed, the disclosure of which is incorporated herein by reference in its entirety. Commercially available films, such as invisibleSHIELD from Zagg Inc., may also be employed. Alternatively, an insert may be provided only at the gap between touch pad sections 48A, 48B, for example of a similar material or smooth gel like material, for a smooth feel and crease resistance. Also, left and right mouse type select buttons 62, 64 are also preferably provided for the touch pad as shown. Additional physical buttons may also be provided, for example, gaming control buttons. Alternatively, in place of a two section touch surface 48 a single piece touch surface may be provided in the form of a bendable touch sensitive film. Such bendable touch sensitive films are commercially available, for example, the XSense film from Atmel Corporation may be employed for touch surface 48 mounted on a suitable substrate in each section and spanning the gap between sections or currently the XTouch sensor from Unipixel Corp.

Touch pad 48 may provide a number of control functions for controlling the displayed content, including various gesture or touch control functions. These may include multi-touch control such as two finger scrolling, two finger pinch type image contraction and expansion, etc. Also, in an embodiment the touch pad may have substantially the same aspect ratio as the display (222, FIG. 8) and touch locations may mirror screen locations so the user may touch an area directly rather than scrolling to an area. Also, the touch pad may include select functions by tapping or pressing the surface so activation of functions may be provided more quickly than using buttons 62, 64. These options may be user selectable as different settings.

Also, as shown in FIG. 4 on activation of a keyboard button 60 the main keys of a full function keyboard may be displayed in a relatively uncrowded layout on the touch pad. This may be provided by backlighting the touch pad via LEDs and a layer under the touch pad with a keyboard pattern for illumination. Alternatively, a touch screen 48 may be provided instead of a touch pad which displays the keyboard. More specifically, the keyboard layout includes a conventional QWERTY set of text keys split on the two sections 1, 2 of the two-piece housing. Also a full set of numeric keys may be provided along with a set of function keys and conventional standardized keys such as shift, ctrl, alt, etc. In an application where less than a full set of keyboard keys is desired, however, for example, an application where only text and number entry is needed such as for searching and/or email, a reduced key layout may be employed. For example, only four rows of keys can accommodate QWERTY text input and with a fcn key also providing number entry and selected additional key functions. As noted above inputs adapted for game control may be provided on the inner surfaces, examples of which are disclosed in the above noted '390 patent incorporated by reference. Also inputs adapted for game control may be displayed on the touch pad or touch screen 48. Also, in the case of a touch screen additional input icons may be displayed in place of the keyboard on surface 48, for example to provide home control functions without requiring activation of the main display 222 or in combination with display 222.

Figure 9:
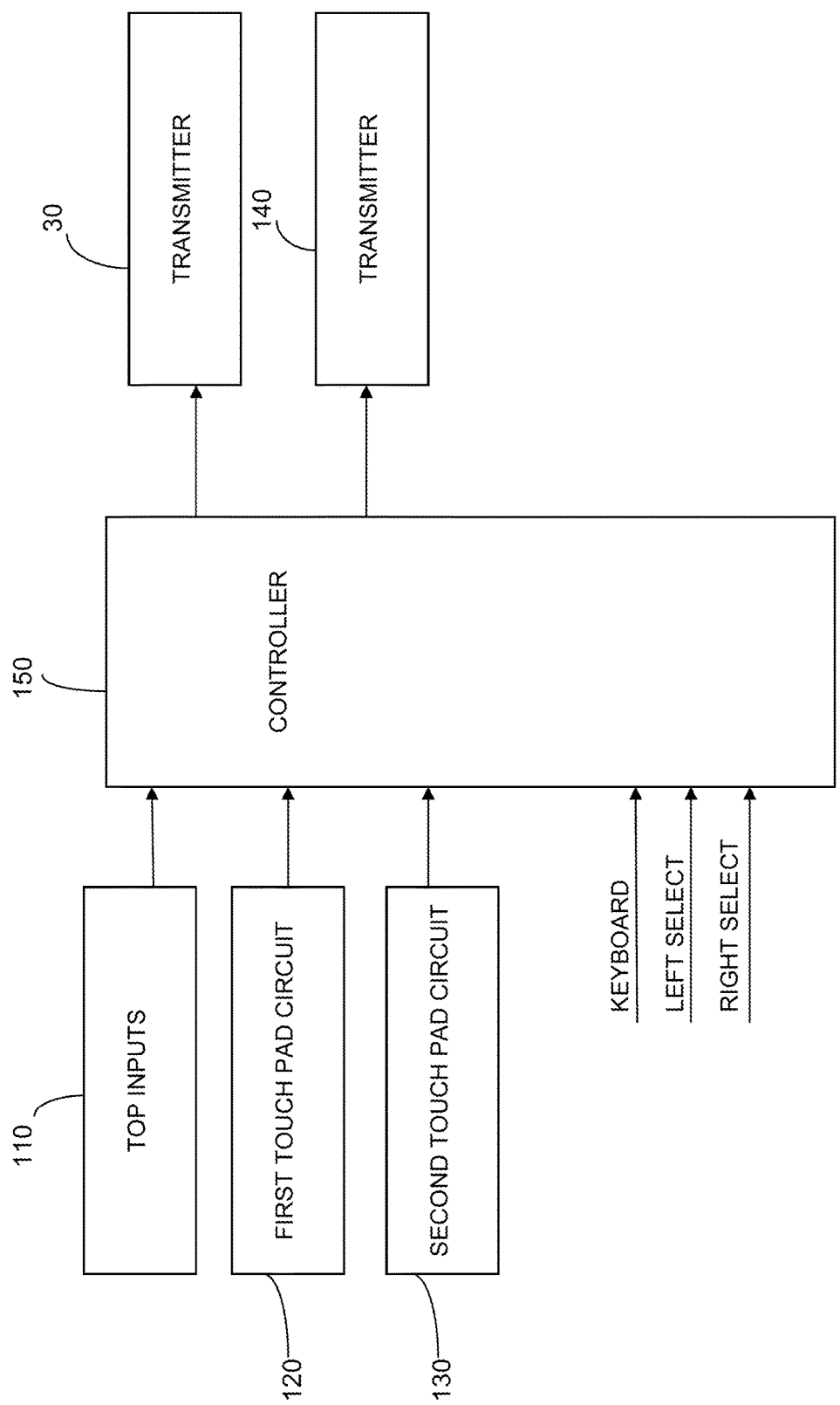
FIG. 9 is a schematic drawing of the remote control input and transmission circuitry.

The transmission control and top button control circuitry of the remote controller may generally correspond to that described in the above noted patents incorporated herein by reference and is not described in detail herein. As shown in FIG. 9 top button circuitry 110 may be connected to an IR LED transmitter 30 in a dual transmitter embodiment or to a single transmitter 140 (preferably an RF transmitter). In addition the first touch pad section 48A and the separate second touch pad section 48B have separate circuits 120, 130 which are connected to a controller 150. Controller 150 combines the two touch pad inputs to a single touch pad signal which is transmitted by transmitter 140 to the display control device as a single control. For example, a single control signal of an HID protocol covering control of the screen may be sent by combining the two separate touch inputs in a substantially seamless manner, and with the exception of the small gap between sections the user will feel as if a unitary touch pad is being used. Also, the small gap may be eliminated in the control signal by interpolating the motion on either side of the gap. More specifically the controller 150 may detect motion approaching the gap and extrapolate the control signal based on the velocity immediately prior to the gap to provide a continuous signal as the user's finger crosses the gap. Also, the gap between sections will be smaller than a user's finger so the finger tip will touch the second pad section prior to moving off the first pad section. This provides two sets of input information which will be available for smoothing of touch position information across the gap. As one example, a weighted average of the two input locations may be employed. Also the weighted average may be time variable. For example, if finger position is moving from section 1 to section 2 across the gap, the position may be continuously or discretely varied from 90% old (section 1 position output)+10% new (section 2 position output) initially to 90% new (section 2 position output)+ 10% old (section 1 position output) over a short time scale. Also, this time scale may be chosen based on an initial velocity of finger motion approaching the gap. Alternatively, the weighted average may be based on the number of activated sensor points on each side to estimate finger position over the gap. Although preferably provided on the remote processor this smoothing function may also be provided by control software at the controlled device (281 or 222). Controller 150 may also switch the control input from touch surface 48 from a relative motion control output signal to absolute position control when the keyboard is displayed. Typically absolute position information is detected in touch pads and converted to relative motion control while absolute position is used in touch screen applications. In this case the two modes are switched when the keyboard is displayed or not.

Also, it will be appreciated that if a single bendable touch sensor 48 is employed as discussed above circuitry 120, 130 may be combined. Also in this case smoothing across the gap as discussed above will typically not be necessary as continuous position information will be provided across the gap.

Figure 7:
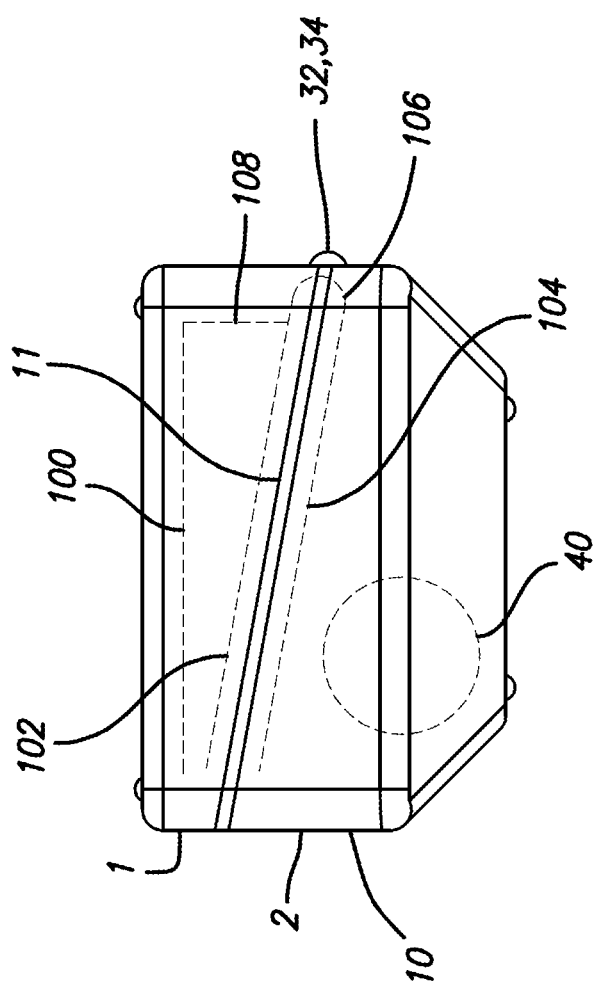
FIG. 7 is an end view of the remote controller of the present invention in a closed configuration illustrating internal circuit board and battery configurations.

As shown in FIG. 7, top section 1 may incorporate the top inputs 12 and touch pad circuitry on two circuit boards 100, 102 configured at an angle to match the surfaces with the corresponding inputs 12, 48. The bottom section 2 in turn may have a single circuit board 104 and circuit boards 102, 104 are coupled via a flex circuit 106 through the hinges 32, 34. Also, as noted above circuit boards 100 and 102 are preferably coupled via a second flex circuit 108 to share a processor/controller or to share a transmitter.

As in the above noted '156 and '242 patents in alternate embodiments of the remote controller a smaller touch pad may be employed as the multi-directional controller 24, and such are equally disclosed herein by incorporation. It will of course be appreciated that other types of controllers may be employed in place of controller 24, for example, a force sensitive controller may also be employed. Also, a motion sensitive controller may be provided which are known and need not be described in detail. It will be appreciated that all such embodiments are implied herein.

Figure 10:
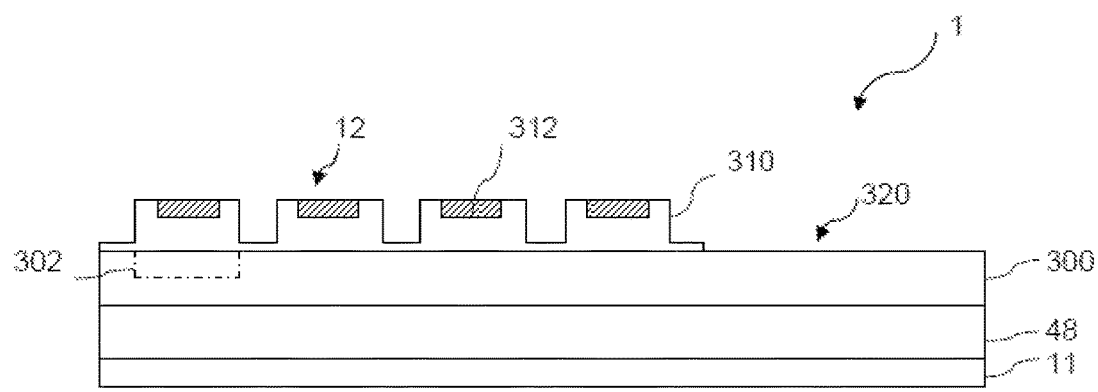
FIG. 10 is a side sectional view of the top section of the remote control in an alternate embodiment.
Figure 11:
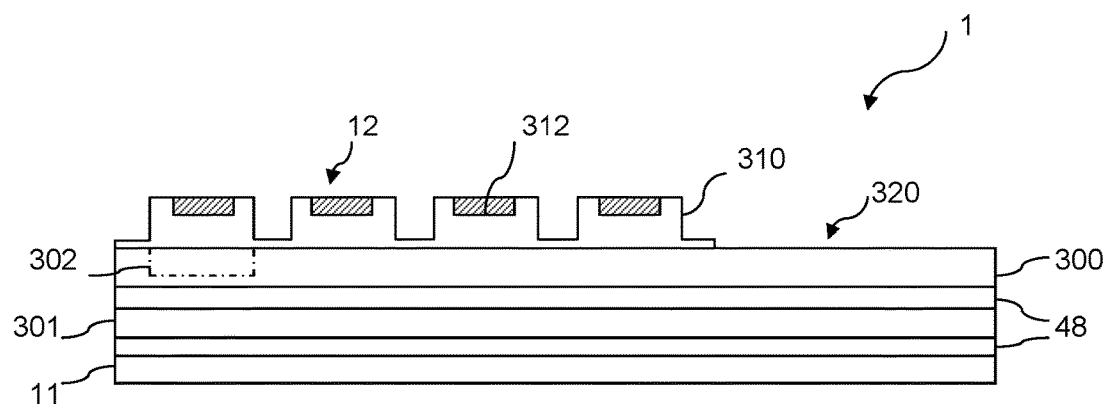
FIG. 11 is a side sectional view of the top section of the remote control in an alternate embodiment.

In an alternate embodiment where the split between sections 1 and 2 is not at an angle, the touch surface 48 may allow the top input circuit board 100 to be dispensed with. This is illustrated in FIG. 10 in a side sectional view of the top section 1. The top portion of touch surface 48 is shown with a substrate 300 between the touch surface and a top layer of rubber or other material 310 forming keys 12 depressible in an essentially conventional manner. A plastic housing layer (not shown) may be provided to surround and cover the layer 310 with openings for the keys to be held in the desired position, similarly to conventional remote control key design. Material forming layer 310 should be chosen along with spacing of substrate 300 to not register with the touch sensor 48. Alternatively if a bendable touch sensitive film 48 is employed it may wrap around a substrate 301 to form a continuous touch surface with top and bottom touch surface areas as shown in FIG. 11, in which case an angled section may be employed as above if desired with substrate 301 having a wedge shape (as shown for section 1 in FIG. 1C). A bendable touch sensitive film 48 employed to wrap around a substrate 301 to form a continuous touch surface with top and bottom touch surface areas may also allow more flexibility in remote thickness determined by thickness and shape of substrate 301 and may allow for more variation in touch region 48 shape.

An inner "puck" 312 in each key in turn is formed of a suitable material to register with the sensor 48 when the key is depressed. To facilitate this a region 302 under each key may be provided with different material or an air gap to allow registration of the depressed key. When the keyboard is closed the detected touch positions will register as the corresponding key by controller 150. Also, a portion of the top surface 320 may be used as a multi-position controller by spacing that portion of the substrate so that finger position will register with sensor 48. That is region 320 may operate as a conventional touch pad controller (and may optionally replace the conventional up/down/right/left buttons). This region 320 may be combined with key press sensing or be a separate application of the top sensing capability. Alternatively, physical deformable buttons 12 may be dispensed with and replaced with an etched film with the button labels.

Alternatively the puck 312 may be dispensed with and the sensor 48 detects the user's finger when it presses down the membrane and becomes sufficiently close to sensor 48 to register as a key touch with the controller. Alternatively, keys 12 may comprise plastic caps which are positioned on top of a membrane with raised deformable bubbles, aligned and held in place by a plastic housing or by a scissor switch mechanism. Such deformable membranes are well known in keyboard design, however, material and spacing should be selected for the touch sensor response. In either case the touch sensor may be responsive to the membrane contact, key proximity, or finger proximity to provide a key touch response with the controller.

In an alternate embodiment the configuration shown in FIG. 10 or FIG. 11 may comprise the entire remote control in a very thin implementation (rather than a single section of a two section folding remote. In this embodiment layer 11 may be dispensed with and the lower edge portion provided with a rounded area for a more ergonomic feel. The lower touch surface may now operate as a touch controller as described above when the remote is turned upside down with however a depth approximately half that of the prior folding embodiment. The basic controller circuitry of FIG. 9 may be employed with controller 150 distinguishing top and bottom input from the coordinates of single touch sensor 48. An additional orientation sensor and input to controller 150 may be provided to detect the orientation of the remote (up or down) and deactivate the bottom input. Such orientation sensors are known. Alternatively, the touch sensor may detect finger or palm positions and employ that to determine the manner in which the remote is operated and controller 150 (FIG. 9) will simply ignore inputs from coordinates in the bottom of the touch surface. Alternatively, operation of a specific button 12 may be used to flip orientation operation. (A hard wired, vs touch based, button 12 may also be coupled to controller 150 and used for on/off control.) Also, in the embodiment of FIG. 11 the single sensor will wrap around the side of the remote and this may be used to e.g., detect plural fingers (or a palm) and determine remote orientation. Other control functions may also be provided by this side sensing portion, for example a swipe sensing volume control, channel up/down or page up/down function, or scroll function may be provided.

Figure 12:
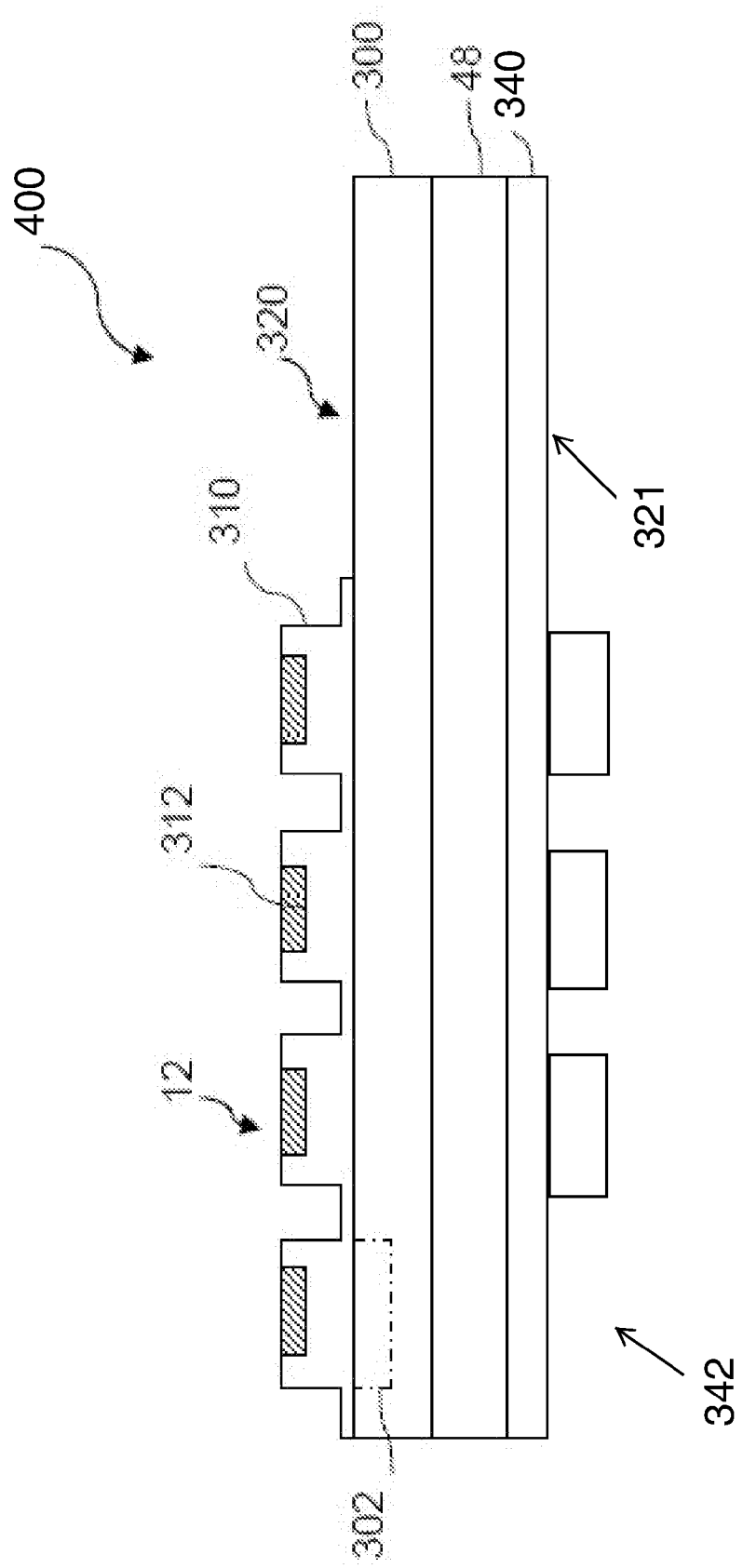
FIG. 12 is a side sectional view of the top section of the remote control in an alternate embodiment.

Referring to FIG. 12 an alternate embodiment 400 is illustrated which may comprise a side sectional view of the entire remote control or a corresponding view of a top section of a folding remote control such as described previously (both embodiments equally implied herein, as noted above for the configurations of FIGS. 10 and 11). The embodiment of FIG. 12 employs tactile inputs, 312 and 342, respectively, on top and bottom surfaces of the remote (or remote section). The tactile inputs 342 may be of the same construction as inputs 12 (including for example a deformable membrane and inner puck if needed for registering with the touch sensor 48) and are simply shown more schematically for ease of illustration. Inputs 342 will in general have a different button layout, however, for example a QWERTY keyboard layout for inputs 342 as opposed to a remote control input layout for inputs 12. The height of buttons 312, 342 may also differ and also buttons 342 may be recessed if desired for ergonomics. Inputs 342 may be mounted on a substrate 340, similarly to substrate 300 for inputs 12, with however potentially differing spacing so that both sets of inputs register on a single touch sensor 48 when depressed. This shared sensor 48 provides a cost and space advantage over prior double sided key configurations which require two sets of PCBs. It should be noted that substrates 300, 340 are not to scale and may be very thin or even dispensed with, depending on the construction and sensitivity of touch sensor 48. As discussed above a plastic housing shell will be provided for basic ergonomic feel, structural support and to house additional components such as batteries and also hold the inputs 12, 342 in place and as such 300, 340 may be viewed as side views of a portion of the housing. Also, the embodiment of FIG. 12 may optionally provide a second touch input surface 321 sharing single sensor 48 and operable like sensor 320. As in the embodiments of FIGS. 10 and 11 various approaches may be employed to determine which side is activating the sensor 48. In the case of inputs 12 and 342 an additional approach may employ a known offset in location between the top and lower inputs points of registration with sensor 48 when depressed and the controller may determine which set of inputs (upper or lower) is activated by the coordinate position without requiring a separate orientation sensor.

In an embodiment where the structure 400 is not the entire remote but is the top section of a folding remote, tactile buttons may optionally be provided on the lower section and may employ a touch sensor there as well or may be of a more conventional tactile button and PCB design.

Figure 8:
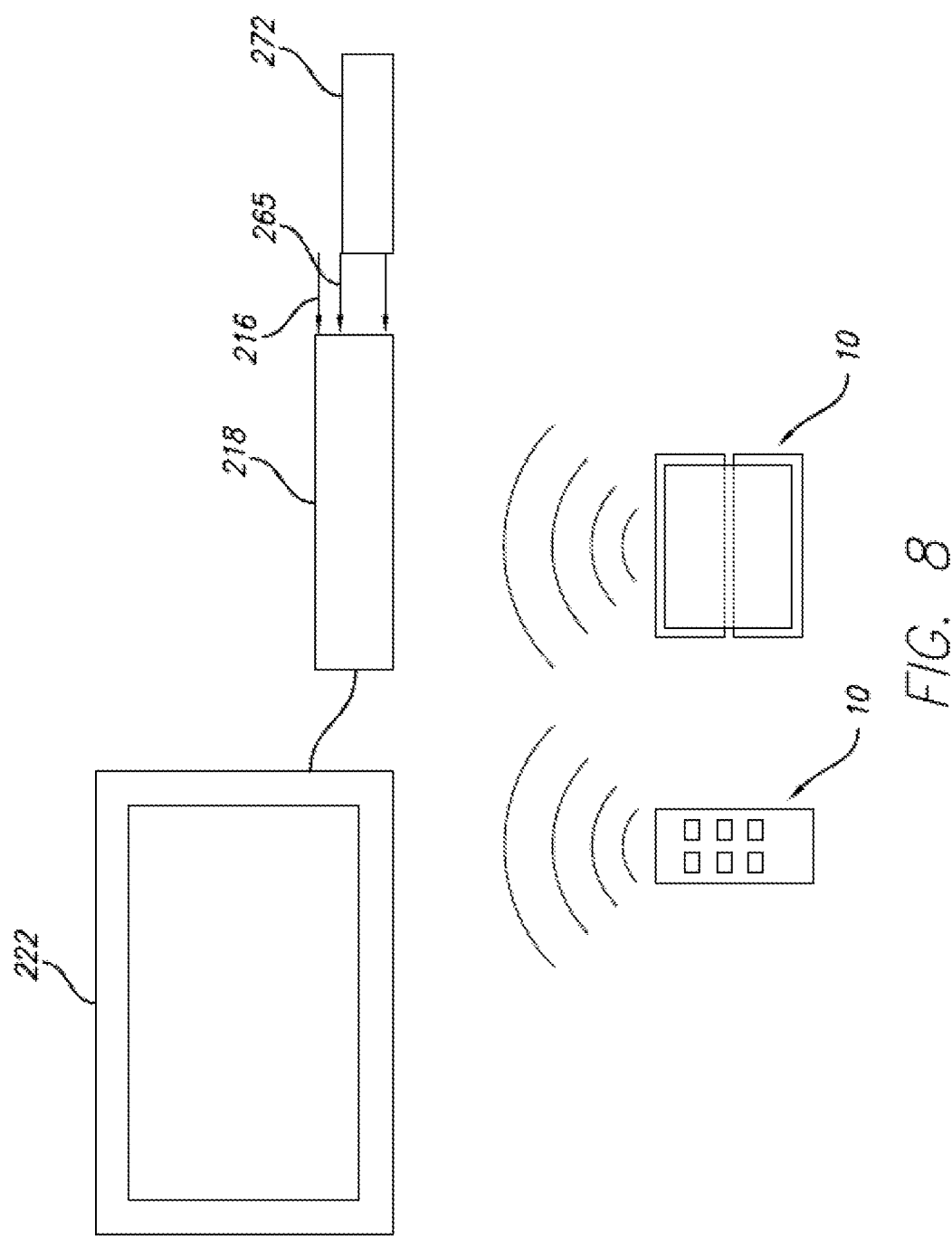
FIG. 8 is a schematic drawing of an improved entertainment system in accordance with the present invention.

Referring to FIG. 8 an improved entertainment system in accordance with the present invention is illustrated. As shown, the entertainment system includes a TV monitor 222 which is coupled to a data processing device 218 of the type which receives text input control signals, such as a PC or internet access device. Also, additional devices or inputs may be provided to the entertainment system, e.g., a DVR 272, wired or wireless networked device coupled to a PC or other media server and other video and data inputs indicated generally by inputs 216 and 265 in FIG. 8. Also shown is remote 10, illustrated in both the first (open) and second (closed) configurations as described above. Remote 10 provides typical TV type control signals to the entertainment system in the second (closed) position, such as volume up/down and power, and text input control signals in the first (open) position.

The present invention may also be employed a compact internet access device and may incorporate a microphone, speaker and provide a videophone or VOIP capability as described in the above noted patents incorporated herein by reference. Also the present invention may be employed in applications such as transportation where a wired rather than wireless remote is preferred, such as airline or automobile video interactive entertainment systems.

It will be appreciated by those skilled in the art that the foregoing is merely an illustration of the present invention in currently preferred implementations. A wide variety of modifications to the illustrated embodiments are possible while remaining within the scope of the present convention. Therefore, the above description should not be viewed as limiting but merely exemplary in nature.

What is claimed is:

1. A remote control, comprising:
   upper and lower surfaces;
   a shared touch sensor, responsive to touch input including substantially continuous motion, configured on or adjacent the upper or lower surface and responsive to touch input on both the lower surface and the upper surface; and
   at least one controller coupled to the touch sensor and providing touch control information separately responsive to touch input on the upper and lower surfaces.

2. A remote control as set out in claim 1, further comprising a wireless transmitter for transmitting touch control information to a controlled device.

3. A remote control as set out in claim 1, further comprising tactile input buttons configured on the upper surface above the touch sensor location and wherein the touch sensor is responsive to activation of the tactile input buttons.

4. A remote control as set out in claim 3, wherein the upper surface includes a generally flat touch input area separate from the tactile input buttons.

5. A remote control as set out in claim 4, wherein the touch sensor is responsive to continuous motion on the generally flat touch input area and also to activation of the tactile input buttons.

6. A remote control as set out in claim 1, wherein the controller comprises a single controller.

7. A remote control as set out in claim 1, further comprising input regions configured on the upper surface of the first section responsive to touch input and labeled with input icons.

8. A remote control as set out in claim 3, wherein the tactile input buttons comprise a material to activate a touch response on the touch sensor when depressed.

9. A remote control as set out in claim 3, wherein the tactile input buttons comprise a deformable membrane and an insert comprised of said material coupled thereto.

10. A remote control as set out in claim 1, wherein the controller detects hand shape characteristics on the lower surface to determine remote orientation and control activation of the touch input from the upper or lower surface.

11. A remote control, comprising:
    upper and lower surfaces;
    a shared touch sensor configured on or adjacent the upper or lower surface and responsive to touch input including substantially continuous touch input on the lower surface;
    tactile input buttons configured on the upper surface, wherein the tactile input buttons comprise a material and spacing from the touch sensor to activate a touch response on the touch sensor when depressed; and
    at least one controller coupled to the touch sensor and providing touch control information separately responsive to activation of the tactile buttons and touch input on the lower surface.

12. A remote control as set out in claim 11, further comprising a wireless transmitter for transmitting the touch control information to a controlled device.

13. A remote control as set out in claim 11, further comprising a portion of the upper surface without input buttons and wherein the controller outputs touch input control information from touch sensor in response to substantially continuous motion in said portion.

14. A remote control as set out in claim 11, wherein a QWERTY keyboard is displayed or marked on the lower surface.

15. A remote control as set out in claim 14, wherein the controller receives touch input on the lower surface selectively as a QWERTY text input and a continuous touch control input.

16. A remote control, comprising:
    upper and lower surfaces;
    a shared touch sensor configured on or adjacent the upper or lower surface;
    first tactile input buttons configured on the upper surface, wherein the first tactile input buttons comprise a material and spacing from the touch sensor to activate a touch response on the touch sensor when depressed;
    second tactile input buttons configured on the lower surface, wherein the second tactile input buttons comprise a material and spacing from the touch sensor to activate a touch response on the touch sensor when depressed; and
    at least one controller coupled to the touch sensor and providing touch control information separately responsive to activation of the first and second tactile input buttons.

17. A remote control as set out in claim 16, further comprising a first touch pad portion of the upper surface without input buttons and wherein the controller outputs touch input control information from the touch sensor in response to substantially continuous motion in said portion.

18. A remote control as set out in claim 16, further comprising a portion of the lower surface without input buttons and wherein the controller outputs touch input control information from the touch sensor in response to substantially continuous motion in said portion.

19. A remote control as set out in claim 18, wherein the controller is responsive to the location of the touch input on the touch sensor to distinguish touch input from the first and second tactile input buttons.

20. A remote control as set out in claim 17, wherein the lower surface includes a second touch pad region without buttons and the controller is separately responsive to substantially continuous touch input on the first and second touch pad regions and touch input from the first and second tactile input buttons.

* * * * *